United States Patent
Zohner et al.

(10) Patent No.: US 7,500,066 B2
(45) Date of Patent: Mar. 3, 2009

(54) METHOD AND APPARATUS FOR SHARING INSTRUCTION MEMORY AMONG A PLURALITY OF PROCESSORS

(75) Inventors: Thayl D. Zohner, Naperville, IL (US); Lawrence D. Weizeorick, Lisle, IL (US); Keith M. Ellens, Wheaton, IL (US)

(73) Assignee: Tellabs Operations, Inc., Naperville, IL (US)

( * ) Notice: Subject to any disclaimer, the term of this patent is extended or adjusted under 35 U.S.C. 154(b) by 256 days.

(21) Appl. No.: 11/123,866

(22) Filed: Apr. 30, 2005

(65) Prior Publication Data
US 2006/0248318 A1 Nov. 2, 2006

(51) Int. Cl.
*G06F 12/00* (2006.01)
(52) U.S. Cl. .................. 711/147; 711/125; 711/130; 712/205; 712/206
(58) Field of Classification Search ............. 711/147, 711/154; 370/412, 535; 712/210, 35, 205
See application file for complete search history.

(56) References Cited

U.S. PATENT DOCUMENTS 6,202,143 B1 * 3/2001 Rim ........................ 712/210
6,378,041 B2 * 4/2002 Tremblay ................. 711/125
6,567,426 B1 * 5/2003 van Hook et al. ........ 370/535
2003/0235200 A1 * 12/2003 Kendall et al. ........... 370/412
2005/0216702 A1 * 9/2005 Paolucci et al. .......... 712/35

OTHER PUBLICATIONS

K. Gharachorloo, et al., "Memory Consistency and Event Ordering in Scalable Shared-memory Multiprocessors", 17th International Symposium on Computer Architecture, pp. 15-26, May 1990.
Sinclair, Bart, "Analysis of Shared Memory Multiprocessors", Version 2.2, The Connexions Project, Nov. 4, 2002.
"Virtex-II Pro FPGAs" Product Brochure, Xilinx, Inc., 2004.
Gavrichenkov, Ilya, "One Core is Good. Two Cores are Even Better!", X-bit Labs, Dec. 24, 2004.
"Multi-Core Processors—the Next Evolution in Computing", Advanced Micro Devices, Inc., 2005.
"Interfacing Cypress MoBL Dual-Port to Intel PXA272 Embedded Processor", Application Note 5035, Cypress Semiconductor, Mar. 29, 2005.

* cited by examiner

*Primary Examiner*—Sanjiv Shah
*Assistant Examiner*—Jesse Diller
(74) *Attorney, Agent, or Firm*—Davis & Associates; William D. Davis

(57) ABSTRACT

A multiprocessing apparatus includes a memory and a plurality (M) of processors coupled to share the memory. Access to the memory is time-division multiplexed among the plurality of processors. In one embodiment, a selected processor retrieves M words of instruction forming K instructions during a given clock cycle. The selected processor executes M−K NOP instructions if K<M.

23 Claims, 8 Drawing Sheets

METHOD AND APPARATUS FOR SHARING INSTRUCTION MEMORY AMONG A PLURALITY OF PROCESSORS

TECHNICAL FIELD

The present invention relates to multiprocessor architecture. In particular, the present invention is drawn to methods and apparatus for sharing memory among a plurality of processors.

BACKGROUND

Computer systems typically include a processor, a random access memory (RAM), and a number of peripheral devices. The processor, RAM, and peripheral devices communicate with each other using one or more busses.

Significant latencies may occur when a processor accesses a memory across the bus. The processor must contend with other devices sharing the bus and transport over the bus is relatively slow. In order to improve computer system performance, the processor is provided with on-chip cache memories that store local copies of data or instructions. Such on-chip memories greatly improve processor execution times, however, the state of the cache must constantly be monitored to determine if external memory access is required. For example, significant delays for external memory access may be incurred in the event of a cache miss or when flushing the cache.

In a multiprocessor environment, significant overhead can be required to ensure synchronization of the on-chip cache memory of each processor with external memory. In addition to the undesirable amount of semiconductor die space consumed by the cache and overhead, some applications simply cannot tolerate external memory access latencies for flushing or filling the individual caches of the plurality of processors.

SUMMARY

In view of limitations of known systems and methods, various methods and apparatus for sharing memory among a plurality of processors is described.

One embodiment of a multiprocessing apparatus includes a single port memory shared by a first processor and a second processor. The first and second processors and the memory reside within the same integrated circuit package.

Another embodiment of a multiprocessing apparatus includes a memory and a plurality (M) of processors coupled to share the memory. Access to the memory is time-division multiplexed among the plurality of processors.

DETAILED DESCRIPTION

From an execution efficiency standpoint, a single memory per processor model is typically more efficient than a shared memory model because of the potential contention when multiple processors attempt simultaneous access to the shared memory. Providing a separate memory for each processor, however, is not economically desirable when the multiple processor shared memory architecture is implemented as an integrated circuit.

Although a dual port memory could be employed to facilitate a shared memory, dual port memories require considerably more area than a single port memory on the integrated circuit die due to the size of the individual cells of the dual port memory. The use of a single port memory permits achieving a higher memory density. An access policy must be implemented, however, to govern sharing of the memory.

Figure 1:
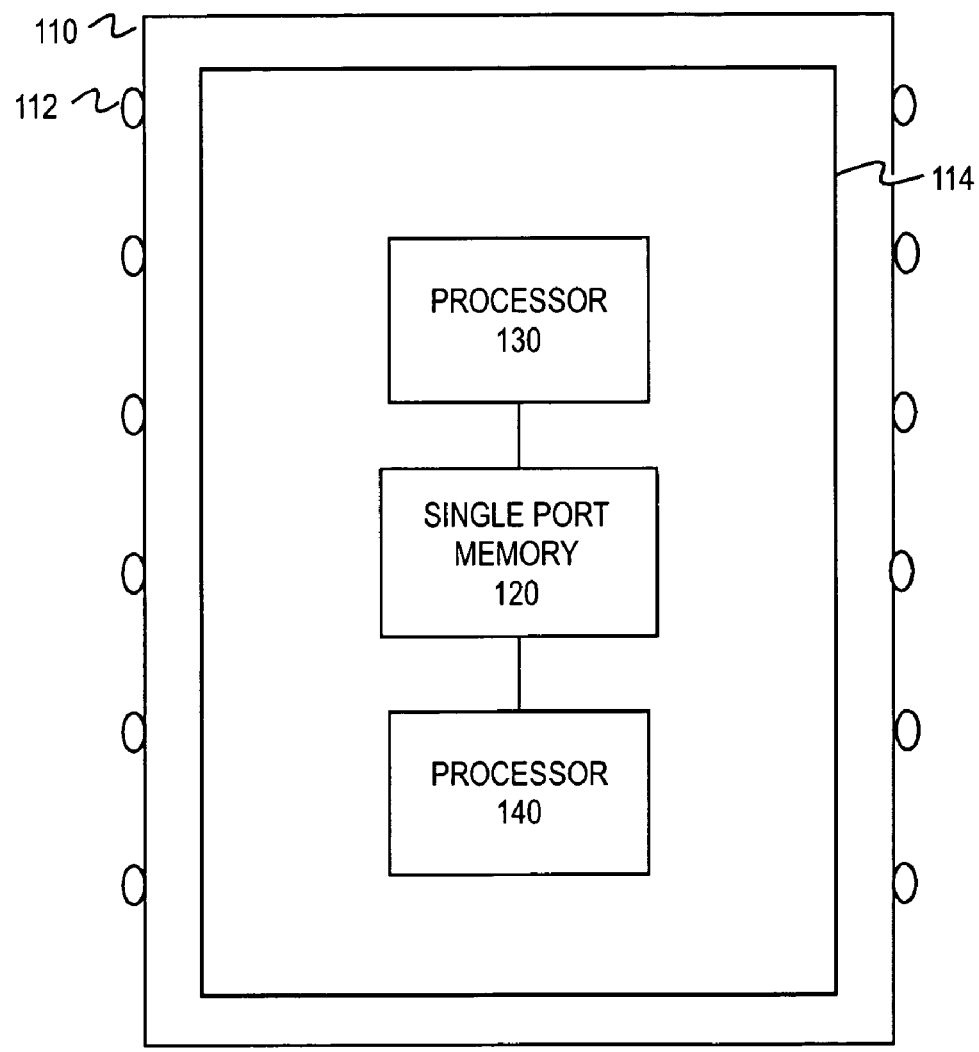
FIG. 1 illustrates one embodiment of multiple processors residing within the same integrated circuit package and sharing a single port memory.

FIG. 1 illustrates one embodiment of multiple processors residing within the same integrated circuit package and sharing a single port memory. A plurality of processors 130, 140 reside within the same integrated circuit package 110. Contacts 112 external to the integrated circuit package permit communication between the processors and devices external to the integrated circuit package. Contacts may be embodied, for example, as pins or pads. In one embodiment, a first processor 130, a second processor 140, and a memory 120 shared by the first and second processors, reside on the same integrated circuit die 114. In one embodiment, the processors 130, 140 and shared memory 120 are fabricated as a complementary metal oxide semiconductor integrated circuit.

The processors may operate independently such that each processor needs access to different locations of the memory at any given time. In contrast to a dual port memory, however, a single port memory only permits access to one address at a time. In order to limit the relative decline in execution efficiency from the limited access, each processor can retrieve multiple instructions per access so that it may execute the retrieved instructions even when it does not have access to the memory (e.g., when another processor is accessing the memory).

Figure 2:
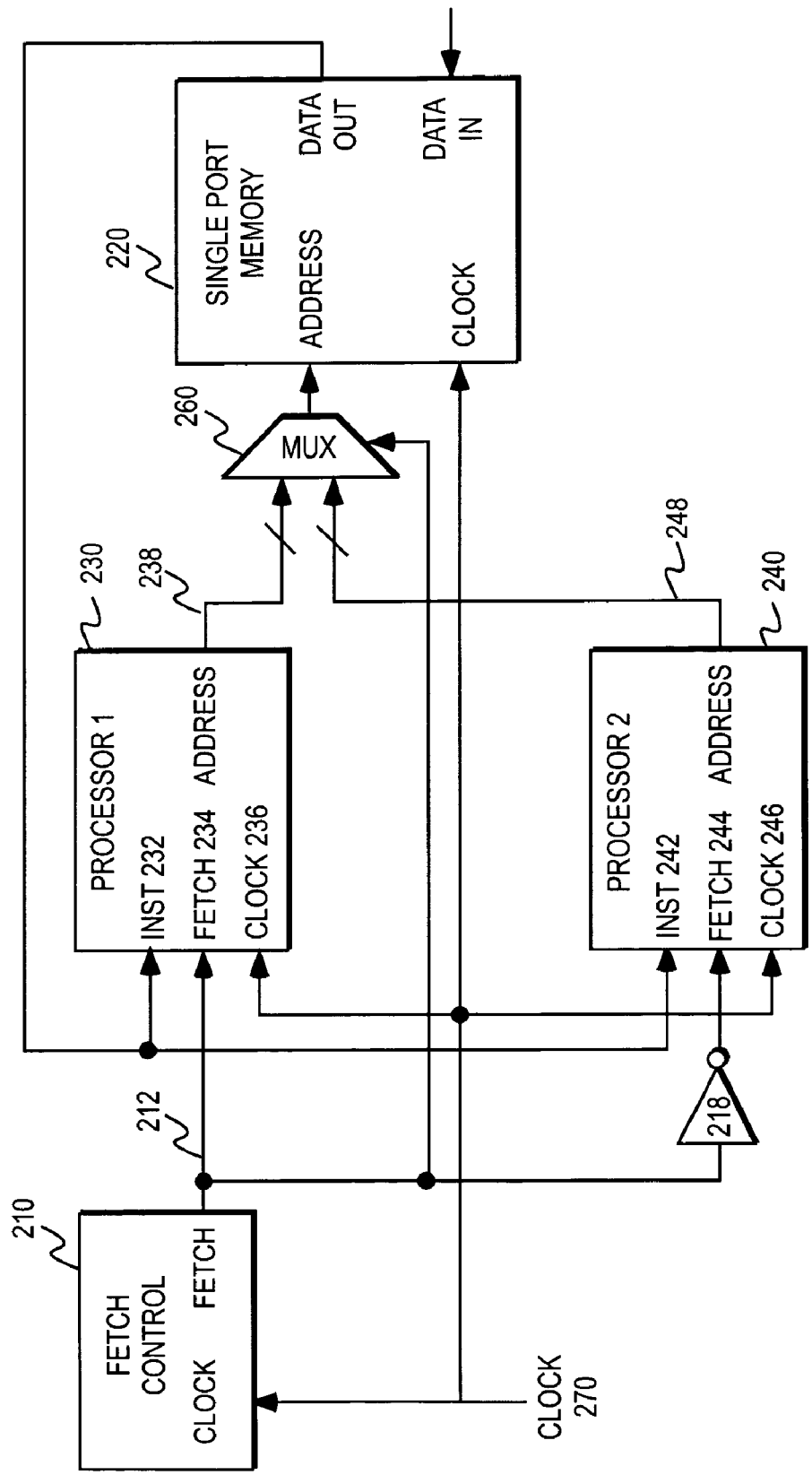
FIG. 2 illustrates one embodiment of a two processor shared memory architecture.

FIG. 2 illustrates one embodiment of a two processor shared memory architecture. First and second processors 230, 240 share a single port memory 220. A fetch control 210 is provided to control which processor accesses memory 220 at any given time. The first processor 230 receives clock 270, instructions 232, and a first fetch signal 234. The second processor 240 similarly receives clock 270, instructions 242, and a second fetch signal 244. The first and second processors 230, 240 provide address signals 238, 248 for accessing shared memory 220.

The first and second fetch signals 234, 244 are complements of each other. This ensures mutually exclusive access to the memory. The fetch signal 212 provided by the fetch control circuit to the first processor 230 is inverted by inverter 218 for the second processor 240. Multiplexer 260 selects the address lines 238, 248 associated with the first and second processors, respectively, in accordance with the fetch signal 212. Shared memory provides the instructions at the address selected by multiplexer 260. In the illustrated embodiment, processors 230, 240 share a common instruction line for receiving instructions from memory 220.

In one embodiment, the processors are Harvard architecture processors utilizing memory 220 as a program store. In contrast with a von Neumann architecture, a Harvard architecture processor has separate signal paths for instructions and data and thus separate memories for instructions and data. A Harvard architecture processor may retrieve an instruction at the same time that data is being retrieved. During normal operation, the plurality of Harvard architecture processors only makes read requests on memory 220.

Memory 220 may be a volatile memory or a nonvolatile memory. In one embodiment, memory 220 is a nonvolatile electrically rewritable memory to permit updating the program store with a new set of instructions. Even though the memory is shared, a single port memory can be used because only one processor at a time has access to the memory. Thus memory 220 may generally be any type of memory used in a single processor architecture including random access memory (RAM) or read only memory (ROM). In one embodiment, memory 220 is a volatile memory that shadows the contents of a memory external to any integrated circuit package that memory 220 resides within.

Figure 3:
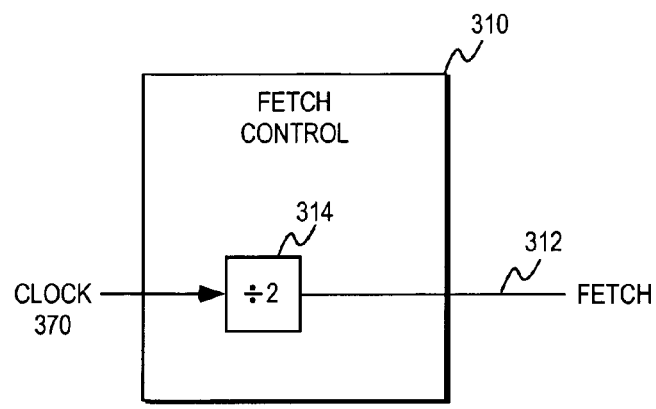
FIG. 3 illustrates one embodiment of the fetch control circuit and timing diagram for a two processor shared memory architecture.
Figure 3:
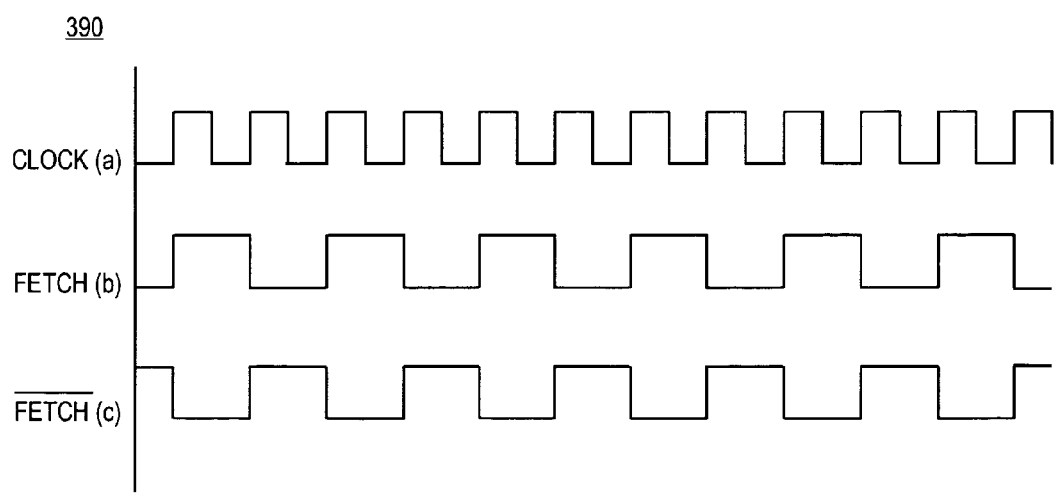

FIG. 3 illustrates one embodiment of the fetch control circuit 310 and timing diagram 390. A divide-by-2 counter 314 generates the fetch signal for the first processor from the clock signal 370. Comparing waveform (a) for the clock signal with waveform (b) for the fetch signal, the fetch signal has half the frequency of the clock signal. The fetch signal associated with the second processor is provided for illustration as indicated by waveform (c).

Given that each processor only has access to the shared memory on every other clock cycle, each processor is permitted to retrieve up to two executable instructions per fetch cycle so that the execution efficiency approaches that of a multiple processor architecture using a dual port memory. For an n-bit instruction size, each processor can retrieve 2·n bits on each fetch cycle. If each instruction only requires a single clock cycle for execution, this technique permits each processor to execute a first instruction while its fetch is asserted and subsequently a second instruction when the other processor's fetch signal is asserted. The minimal instruction size is referred to as a word.

The term "fetch-enabled" indicates that a specific processor has its associated fetch input asserted. "Fetch-disabled" indicates that the fetch input for a specific processor is de-asserted. Processors only have access to the memory (i.e., access window) when fetch-enabled. For a two-processor shared memory architecture, the access window for each processor is during alternate clock cycles such that the fetch signals have a frequency half that of the clock signal.

Figure 4:
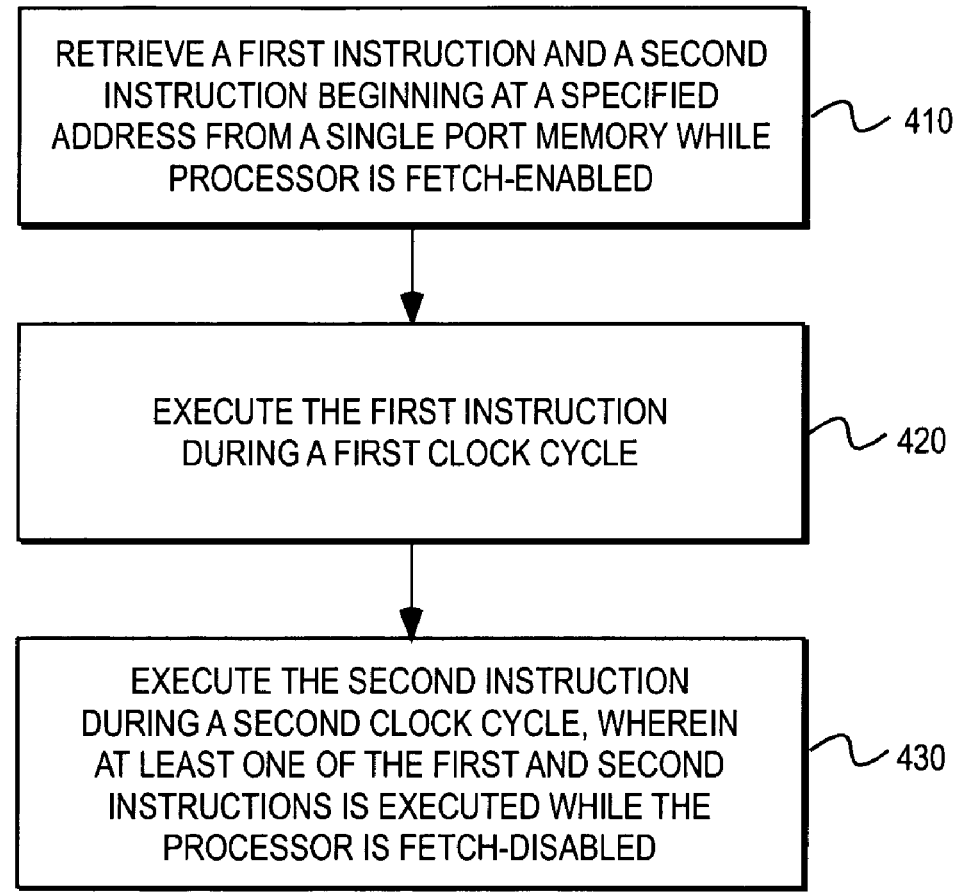
FIG. 4 illustrates one embodiment of the fetch process for sharing a memory with two processors.

FIG. 4 illustrates one embodiment of the fetch process for sharing a memory with two processors. Referring to step 410, each selected processor performs the step of accessing the shared memory at a specified address to retrieve a first word and a second word while fetch-enabled. In step 420, the selected processor executes the first instruction during a first clock cycle. The selected processor executes the second instruction during a second clock cycle in step 430. At least one of the first and second instructions is executed when the selected processor is fetch-disabled.

A variable length instruction may be supported as well. Occasionally, doubleword instructions are required for some operations such as jump instructions. If the doubleword instruction only requires a single clock cycle for execution, however, the processor will run out of instructions to execute prior to its next enabled fetch.

Figure 5:
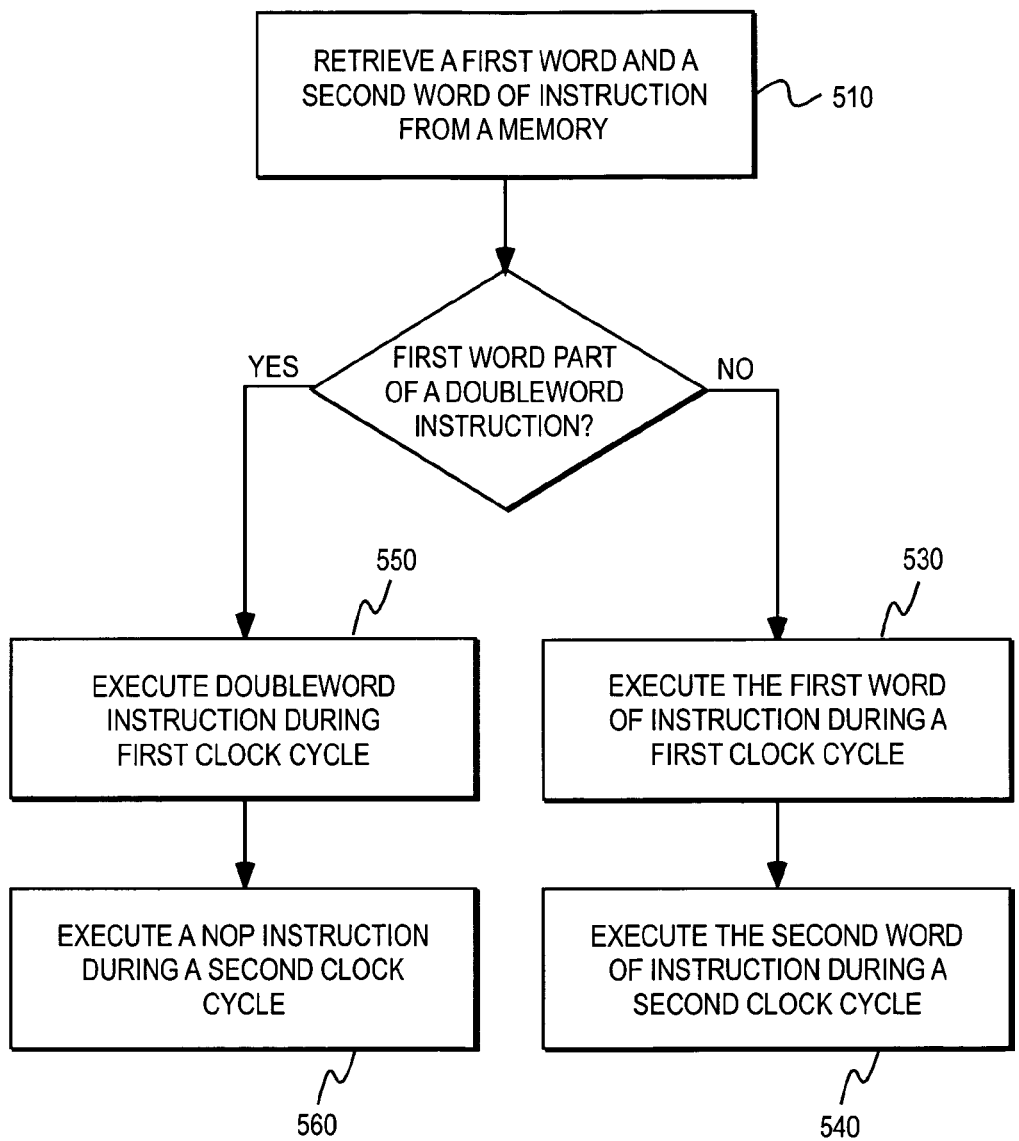
FIG. 5 illustrates one embodiment of a method for executing a mix of single word and double word instructions.

FIG. 5 illustrates one embodiment of the process performed by the processor when handling a mix of single word and doubleword instructions. Doublewords are presumed to be organized on doubleword boundaries within the shared memory to ensure that a fetch cycle never retrieves only part of a doubleword instruction. In step 510, the processor retrieves a first word and a second word of instruction. The retrieval can only be performed while the processor is fetch-enabled. The first and second words may represent two single word instructions or a single doubleword instruction.

Step 520 determines whether the two words form a doubleword instruction. If not, the first and second words represent two single word instructions. The processor executes the first word of instruction during a first clock cycle in step 530. The processor executes the second word of instruction during a second clock cycle in step 540. At least one of the first and second words of instruction is executed while the processor is fetch-disabled.

If the first and second words of instruction form a doubleword instruction, however, the processor executes the doubleword instruction during the first clock cycle in step 550. The processor then performs a NOP instruction during a second clock cycle. At least one of the doubleword and the NOP instruction is executed while the processor is fetch-disabled.

A NOP instruction (i.e., "No OPeration") is a "do nothing" instruction. Generally, execution of a NOP instruction does not alter any registers or values stored in memory (the processor's instruction pointer register is still advanced as it would be with any instruction). The NOP instruction requires only one clock cycle for execution. Different mnemonics may be used for NOP instructions for various processor architectures, however, any instruction that has no net effect on registers or values stored in memory may qualify as a NOP instruction.

Generally at least one instruction is executed while the processor is fetch-disabled. The processor effectively modifies the instruction stream from shared memory by inserting and executing a no-op instruction after any doubleword instructions. If doubleword instructions represent a small fraction of all the executed program instructions, the execution efficiency approaches that of the single memory per processor model.

Figure 6:
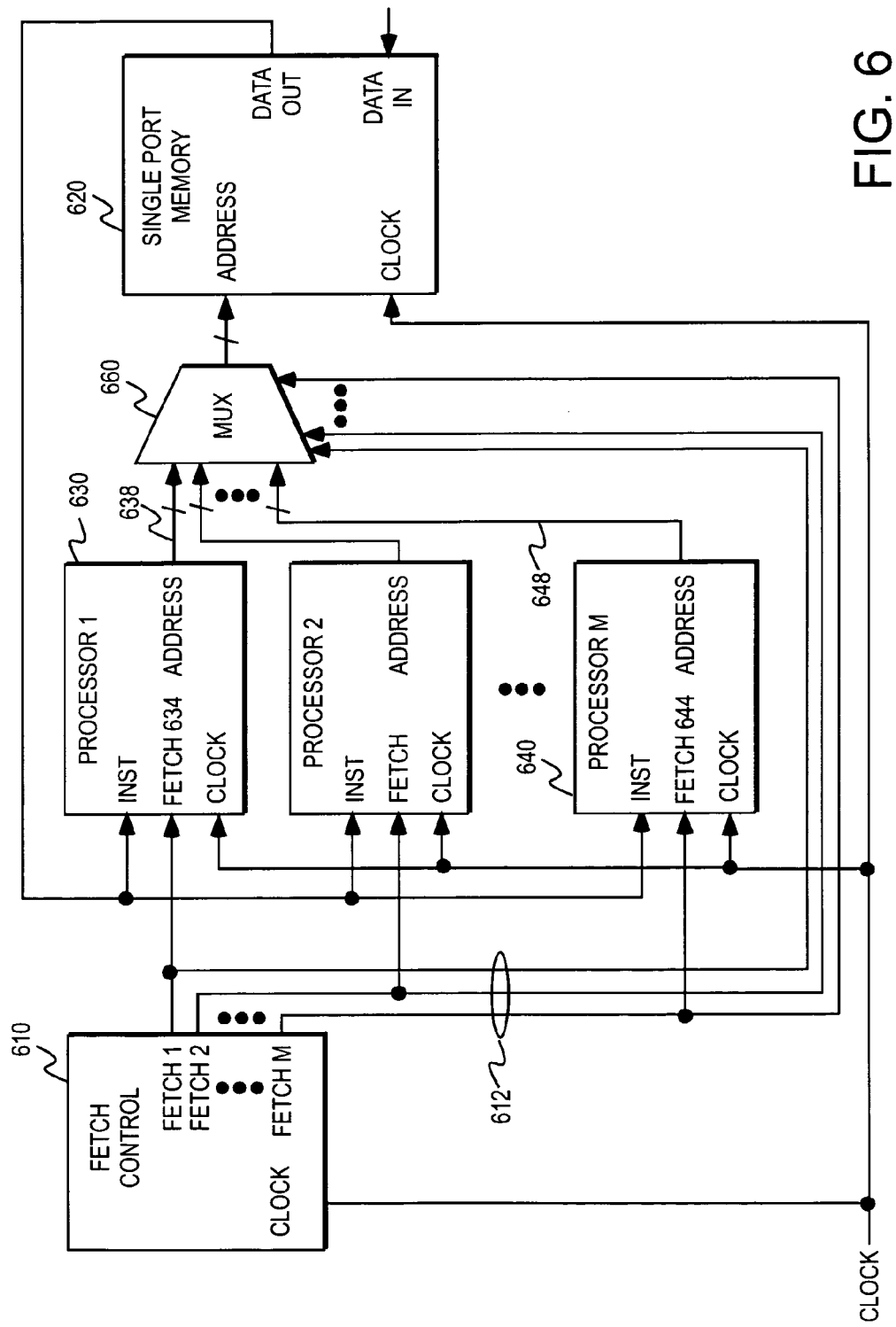
FIG. 6 illustrates one embodiment of a plurality of M processors sharing a memory.

The multiple processor shared memory architecture may be generalized to support more than two processors. FIG. 6 illustrates one embodiment of a plurality of M processors sharing the same memory. Access to the memory is time-division multiplexed among the plurality of processors. Due to the time-division multiplexing, the memory can be a single port memory.

A plurality of M processors 630-640 shares a memory 620. (M is an integer and $M \geq 2$). A fetch control 610 is provided to control which processor accesses the shared memory 620 at any given time. The fetch control provides a plurality of M fetch signals 612, one for each processor. Thus the first processor 630 receives a first fetch signal from the fetch control circuit for its fetch input 634 and the $M^{th}$ processor receives the $M^{th}$ fetch signal from the fetch control circuit for its fetch input 644.

Each processor provides its own address signals 638, 648 for accessing the shared memory. Multiplexer 660 selects the address lines associated with one of the processors in accordance with the fetch signals 612. The fetch-enabled processor receives the instructions beginning at the address it specified from the shared memory. In one embodiment, memory 620 is a single port memory.

Figure 7:
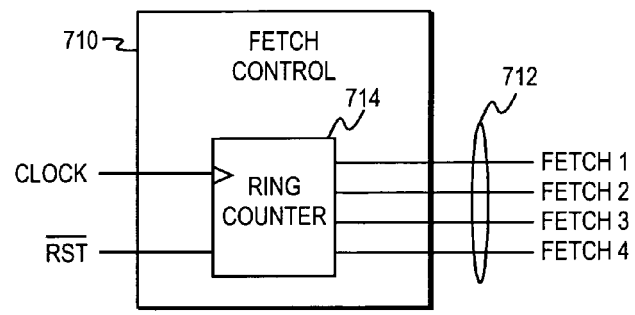
FIG. 7 illustrates one embodiment of the fetch control circuit and timing diagram for an M processor shared memory architecture.
Figure 7:
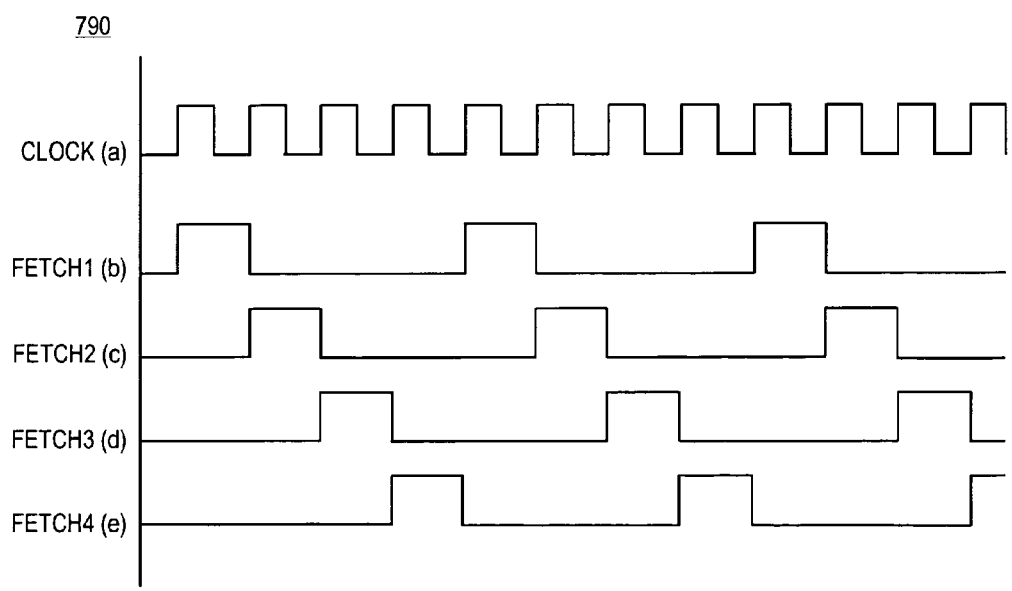

FIG. 7 illustrates one embodiment of the fetch control circuit 710 and timing diagram 790 for an M processor shared memory architecture. The fetch control circuit 710 includes divide-by-M logic 714.

In the illustrated embodiment divide-by-M logic 714 is a ring counter. A ring counter is a shift register that continuously circulates a single one bit around a closed loop. The shift register is typically comprised of a plurality of flip-flops each corresponding to a bit position of the shift register. When asserted, the reset (RST) signal initializes one flip-flop to a "1" while setting the other flip-flops to "0". The flip-flops are ring-coupled such that each clock pulse moves the "1" bit around the ring.

Timing diagram illustrates the fetch signals for M=4. The fetch signals illustrated in waveforms b)-e) have a relative phase displacement of 360°/M. The frequency of each fetch signal is 1/M that of the clock signal of waveform a).

Figure 8:
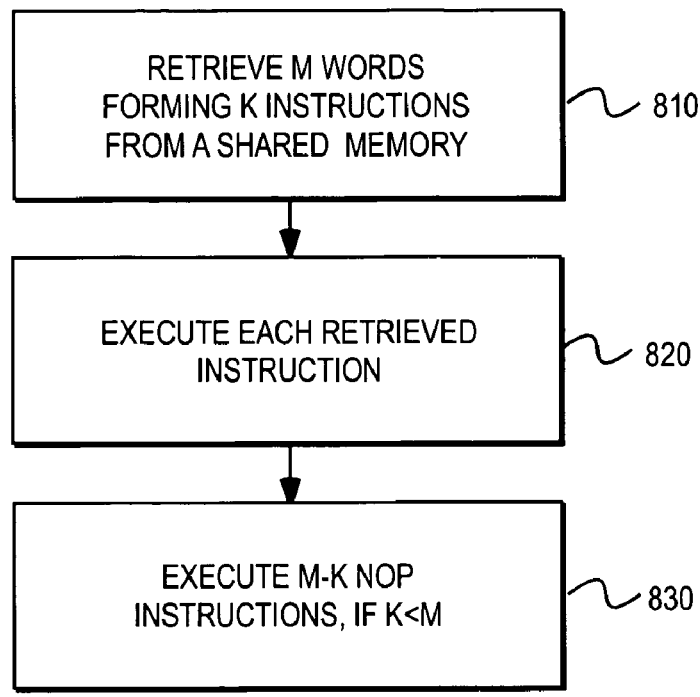
FIG. 8 illustrates one embodiment of a method for executing a mix of single word and multiple word instructions.

FIG. 8 illustrates one embodiment of a method for executing a mix of single word and multiple word instructions. In step 810, the processor retrieves a plurality of M words forming K instructions from a shared memory. The processor has access to the memory only when fetch-enabled. Although M is constant, the number of instructions (K) formed by the M retrieved words of instruction may vary with each access. For any given access, K≦M.

The processor executes each of the retrieved instructions in accordance with a clock signal in step 820. The K instructions are presumed to be single clock cycle instructions. If K<M then the processor will run out of retrieved instructions to execute prior to the next time it is fetch-enabled. To prevent this occurrence, the processor executes M–K NOP instructions when K<M as indicated in step 830.

At least one of the instructions (retrieved or NOP) is executed while the processor is fetch-disabled. In the multiprocessor environment, only one processor is performing step 810 at any given time due to the mutually exclusive nature of their respective fetch signals. In a fixed word-length environment, K=M and the processor fetches M instructions once every M clock cycles.

Figure 9:
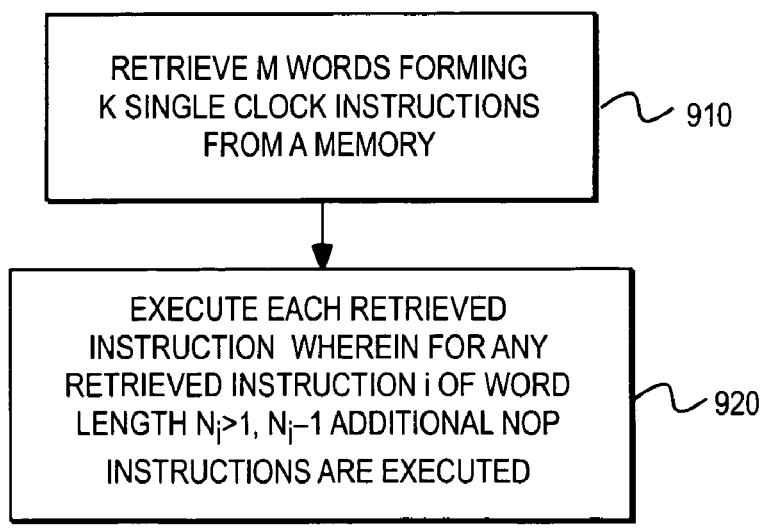
FIG. 9 illustrates one embodiment of a method for executing a collection of retrieved instructions of different lengths.

FIG. 9 illustrates one embodiment of a method for executing a collection of retrieved instructions of different lengths. In step 910, the processor retrieves M words forming K single clock instructions from a shared memory. As indicated in step 920, for any retrieved instruction i of word length $N_i>1$ the processor also executes $N_i-1$ NOP instructions. The processor executes each instruction (retrieved or NOP) in accordance with a clock cycle. Step 910 is performed while the processor is fetch-enabled. At least one instruction (either retrieved or NOP) will be performed while the processor is fetch-disabled. In the multiprocessor environment, only one processor is performing step 910 at any given time due to the mutually exclusive nature of their respective fetch signals.

Thus a multiprocessor apparatus includes a plurality of processors coupled to share a memory. Access to the memory is time-division multiplexed among the plurality of processors. The memory and processors may reside within a same integrated circuit package and on a same integrated circuit die. The memory can be a single port memory. In one embodiment, the processors are Harvard architecture processors and the memory is a program store. In a fixed instruction size environment, each processor retrieves M instructions once every M clock cycles. In a variable instruction size environment, each processor retrieves M words containing K instructions once every M clock cycles. If some of the instructions are multiple words in size such that K<M, then M–K NOP instructions are inserted by the processor to ensure that the processor executes an instruction every clock cycle even in a mixed instruction size environment. In particular, for each instruction i having a length $N_i>1$, the processor inserts and executes $N_i-1$ NOP instructions.

A multiprocessor apparatus incorporating a shared memory has been described. Various modifications and changes may be made thereto without departing from the broader scope of the invention as set forth in the claims. The specification and drawings are, accordingly, to be regarded in an illustrative rather than a restrictive sense.

What is claimed is:

1. An apparatus, comprising:
   first and second processors; and
   a single port memory shared by the first and second processors, wherein the first and second processors and the memory reside within the same integrated circuit package, wherein while a selected one of the first and second processors is fetching M words forming K single-clock instructions from the memory, the other of the first and second processors is executing instructions, wherein the selected one is fetch-enabled at intervals of M clock cycles, wherein the selected one executes M–K NOP instructions in addition to the K instructions if K<M.

2. The apparatus of claim 1 wherein the first processor retrieves a first and a second instruction from the shared memory while its fetch signal is enabled.

3. The apparatus of claim 1 wherein the first and second processors and the memory reside on a same integrated circuit die.

4. The apparatus of claim 1 wherein the first and second processors and single port memory are fabricated as a complementary metal oxide semiconductor (CMOS) integrated circuit.

5. An apparatus, comprising:
   a memory storing executable single-clock instructions; and
   a plurality (M) of processors coupled to share the memory, wherein instruction fetches from the memory are time-division multiplexed among the plurality of processors, wherein each selected processor of the plurality of processors retrieves M words of instruction forming K instructions during a given clock cycle, wherein if K<M, the selected processor executes M–K single clock NOP instructions in addition to the K instructions.

6. The apparatus of claim 5 wherein the processors are Harvard architecture processors and the memory is a program store.

7. The apparatus of claim 5 wherein each processor has access to the memory every M clock cycles.

8. The apparatus of claim 7 wherein the processor retrieves M words of instruction forming K instructions during a given clock cycle, wherein K=M such that the K instructions have the same size.

9. The apparatus of claim 5 wherein the plurality of processors and the memory reside within a same integrated circuit package.

10. The apparatus of claim 9 wherein the plurality of processors and the memory reside on a same integrated circuit die.

11. The apparatus of claim 10 wherein the plurality of processors and memory are fabricated as a complementary metal oxide semiconductor (CMOS) integrated circuit.

12. The apparatus of claim 5 wherein M=2.

13. The apparatus of claim 5 wherein M<2.

14. A method of sharing a memory among a plurality of processors, wherein each processor:
   a) retrieves M words forming K single-clock instructions from a shared single port memory while the processor is fetch-enabled at intervals of M clock cycles;

b) executes each retrieved instruction; and c) executes M–K NOP instructions if K<M, wherein at least one instruction is executed while the processor is fetch-disabled.

15. The method of claim 14 wherein M=K.

16. The method of claim 14 wherein the plurality of processors are mutually-exclusively fetch-enabled such that no two processors access the shared memory concurrently.

17. The method of claim 14 wherein each of the retrieved instructions and any NOP instruction is a single clock instruction.

18. The method of claim 14 wherein the plurality of processors and the shared single port memory reside on a same integrated circuit die.

19. A method of sharing a memory among a plurality (M) of processors, wherein each processor:

a) retrieves M words of K single-clock instructions from a shared single port memory while that processor is fetch-enabled at intervals of M clock cycles;

b) executes each retrieved instruction, wherein for any retrieved instruction i of word length $N_i > 1$, $N_i - 1$ NOP instructions are also executed.

20. The method of claim 19 wherein each of the retrieved instructions and any NOP instructions are single clock instructions.

21. The method of claim 19 wherein the plurality of processors are mutually-exclusively fetch-enabled such that no two processors access the shared memory simultaneously.

22. The method of claim 19 wherein the plurality of processors and the shared memory reside within a same integrated circuit package.

23. The method of claim 19 wherein the plurality of processors and the shared memory reside on a same integrated circuit die.

* * * * *